(12) United States Patent
Brockett et al.

(10) Patent No.: US 6,470,107 B2
(45) Date of Patent: Oct. 22, 2002

(54) FLUIDIC ALL-OPTICAL SWITCH

(75) Inventors: Roger Brockett, Lexington; Stanley M. Jurga, Jr., Shirley, both of MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 09/834,181

(22) Filed: Apr. 12, 2001

(65) Prior Publication Data

US 2002/0131676 A1 Sep. 19, 2002

Related U.S. Application Data

(60) Provisional application No. 60/275,426, filed on Mar. 13, 2001.

(51) Int. Cl.[7] .............................. G02B 6/26; G02B 6/42
(52) U.S. Cl. .............................. 385/16; 385/18; 385/19; 359/196
(58) Field of Search ...................... 385/16–23; 349/146, 349/97

(56) References Cited

U.S. PATENT DOCUMENTS

| | | | | |
|---|---|---|---|---|
| 4,384,761 A | * | 5/1983 | Brady et al. ................... 385/18 |
| 4,505,539 A | * | 3/1985 | Auracher et al. ......... 200/81 R |
| 5,699,462 A | | 12/1997 | Fouquet et al. ............... 385/18 |
| 5,892,862 A | | 4/1999 | Kidder et al. .................. 385/16 |
| 6,040,935 A | | 3/2000 | Michalicek .................. 359/198 |
| 6,055,344 A | | 4/2000 | Fouquet et al. ............... 385/16 |
| 6,154,586 A | * | 11/2000 | MacDonald et al. .......... 385/18 |
| 6,181,458 B1 | | 1/2001 | Brazas, Jr. et al. ......... 359/290 |
| 6,198,856 B1 | | 3/2001 | Schroeder et al. ............. 385/17 |
| 6,212,308 B1 | * | 4/2001 | Donald ......................... 385/16 |
| 6,377,383 B1 | * | 4/2002 | Whitehead et al. .......... 359/222 |

FOREIGN PATENT DOCUMENTS

| | | | |
|---|---|---|---|
| EP | 0 550 022 B1 | 5/1997 | .......... G02B/26/08 |
| EP | 0 932 066 A1 | 7/1999 | .......... G02B/26/02 |
| EP | 0 830 624 B1 | 4/2000 | ............ G02B/5/18 |
| WO | WO 96/41217 | 12/1996 | ............ G02B/5/18 |
| WO | WO 00/25160 | 5/2000 | ............ G02B/6/26 |

OTHER PUBLICATIONS

Brochure, "Lucent's New All–Optical Router Uses Bell Labs Microscopic Mirrors," Bell Labs Innovations in the news, (Nov. 10, 1999).
Brochure, "Agilent Photonic Switching Platform N3565A 32 × 32 Photonic Switch," Agilent Technologies, REV A 4/00.

* cited by examiner

*Primary Examiner*—Hemang Sanghavi
*Assistant Examiner*—Scott Knauss
(74) *Attorney, Agent, or Firm*—Hamilton, Brook, Smith & Reynolds, P.C.

(57) ABSTRACT

An optical switch includes a first fluid, and a second fluid positioned adjacent to and in contact with the first fluid. The interface between the first fluid and the second fluid defines a reflective surface. The optical switch also includes electrodes for applying an electrical field across the second fluid to alter the geometry of the reflective surface and redirect an incident light beam in one or more directions.

42 Claims, 6 Drawing Sheets

FLUIDIC ALL-OPTICAL SWITCH

RELATED APPLICATION(S)

This application claims the benefit of U.S. Provisional Application No. 60/275,426, filed on Mar. 13, 2001. The entire teachings of the above application is incorporated herein by reference.

GOVERNMENT SUPPORT

The invention was supported, in whole or in part, by a grant No. DAAG559710114 from the Army Research Office. The Government has certain rights in the invention.

BACKGROUND

In previous electrical communications systems, electrical switches were used to route the signals throughout the system by redirecting the signals from various input ports to various output ports. More recently, fiber optics communications networks have been used for added bandwidth. Typically, in these fiber optic networks, the signals are transmitted as light though optical fibers, but the redirection of the signals is still performed with electrical switches. That is, photons of the light beams are converted to an intermediary medium (such as transduction to an electrical charge or voltage) during the switching process.

There are, however, various proposals for using all optical switches. These optical switches are adapted for using a reflective surface to redirect in incident light beam in one or more directions. For instance, European Patent Application EP 0 936 066 A1 describes using micromachined mechanically actuated mirrors to steer the light beams. In another type of optical switch, for example, as disclosed in U.S. Pat. No. 5,699,462, ink jet technology is used to create bubbles actuated in a liquid medium to reroute the signals. And European Patent No. EP 0 550 022 B1 describes an optical switch which uses an electrostatically actuated flexible reflective membrane to steer the light beam in other directions.

SUMMARY

The present invention implements a fluidic all-optical switch that alters the path of a light beam by controlling the geometry of a reflective surface which is defined by the interface between two fluids.

In one aspect of the invention, the optical switch includes a first fluid, and a second fluid positioned adjacent to and in contact with the first fluid. The interface between the first fluid and the second fluid defines a reflective surface that provides total internal reflectance (TIR) for a range of incident angles. The optical switch also includes electrodes for applying an electrical field across the second fluid to alter the geometry of the reflective surface and redirect an incident light beam in one or more directions.

Embodiments of this aspect may include one or more of the following features. The first fluid is a conductive fluid, and the second fluid is an insulating fluid. The first fluid can be a liquid and the second fluid can be a gas. In another embodiment, the first and second fluids can be two immiscible liquids. The first or second fluid can be an organic liquid.

In particular embodiments of this aspect, the first fluid is biased with a constant voltage, and the electrical field which actuates the reflective surface is generated by varying the voltage potential across the second fluid. The varying voltage potential can be created by energizing one or more electrodes positioned on the same side of the reflective surface as the second fluid. The variable voltage can be modulated so that the incident light beam is redirected with little resonance.

In certain embodiments, the optical switch includes a well in which the second fluid resides, and the electrodes are positioned at the bottom of the well. The well can have a depth of about 0.001 to 0.01 inch and a diameter of about 0.02 to 0.07 inch. In one embodiment, the well has a depth of about 0.01 inch and a diameter of about 0.06 inch.

In some embodiments, the fluid interface is formed within an aperture or orifice of a ring positioned over the well. Alternatively, the optical switch can be provided with two layered rings. The combination of the two rings has a inner rim which defines an orifice such that the reflective surface attaches to the rim where the two rings meet. In some arrangements, each ring has a diameter of about 0.02 to 0.07 inch, and a thickness of about 0.00004 to 0.003 inch, in which case the well has a diameter of about 0.1 inch. The first ring can be made of hydrophilic material which attracts liquid, while the second ring can be made from a hydrophobic material which repels liquids. The first ring can also be made from hydrophobic material, and the second ring can be made from hydrophillic material.

The aperture or orifice positioned over the well can be circular or non-circular in shape. The shape and size of the orifice can be varied to alter the natural frequency of the reflective surface. The natural frequency of the optical switch can also be varied by altering the size of the well and the density of the first and second fluids.

The well is typically formed by etching a silicon substrate, and the electrodes are usually embedded in or formed on the substrate.

The optical switch can also include a transparent housing which contains the first fluid. The housing can be made from, for example, acrylic. A wall of the transparent housing is usually oriented so that the incident light beam is orthogonal to the wall. In this configuration, the switch can be used for laser alignment and steering. The optical switch can also include a housing which contains the first fluid and serves to align input and output optical fibers or waveguides.

The optical switch is able to redirect an incident light beam between two points within a very short period of time (e.g., less than about 1 msec). The optical switch is also able to redirect an incident light beam from one or more incoming directions to a multiplicity of directions. For instance, the optical switch can operate as a 1-to-N switching element, where there are N discrete targets. Also, the device is analog in nature, thus the output beam can be steered in a continuous manner.

Related aspects of the invention include a method of steering an incident light beam. The method includes providing a reflective surface defined at the interface between a first fluid and a second fluid, and actuating the reflective surface to alter the geometry of the reflective surface, thereby redirecting the direction of an incident light beam that strikes the reflective surface.

Among other advantages, the optical switch is capable of redirecting an incident light beam in very short time periods, for instance, in under one msec. The optical switch is a pure photonic switch; that is there are no transductions between the input and. the output side of the switch. The all-optically switch does not rely on micro-mechanical structures, mirrors, or other devices that might reduce reliability and degrade performance. The switch is suitable for many different applications. For instance, the switch operates in some applications as a 1-to-N switching interface with a single input switching to a plurality of outputs. In other applications, the optical switch is implemented as an M-to-N switching interface, where M is greater than one. Further, the reflective surface is actuated with electrostatic forces which requires no electrical current. In addition, the switch can be activated to maintain a constant light displacement for prolonged periods of time with a small electrostatic voltage. There are particular advantages of using a fluid-fluid interface as the reflective surface. For instance, the reflective surface provides total internal reflectance, that is, nearly 100% reflectance. The optical switch is simple to construct and assemble, thereby minimizing the costs to fabricate the switch. The reflective surface is under uniform tension, and provides a more uniform surface than micromachined surfaces.

Still further aspects, features, and advantages follow.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. The fluidic optical switch of the present invention is illustrated generally at 10 in FIGS. 1A, 1B, and 1C. The fluidic optical switch 10 is provided with a reflective surface 14 defined at the interface between two fluids 16, 18 having different indices of refraction. Alternatively, the reflective surface 14 can be reflective particles or a reflective film trapped between the two fluids 16, 18. An electrostatic force deforms the geometry of the reflective surface to redirect an incident light beam 12 (e.g. a laser beam). Controlling the deformation of this surface 14 allows for the controlled redirection of the incident beam of light at different angles and in any direction.

Figure 2:
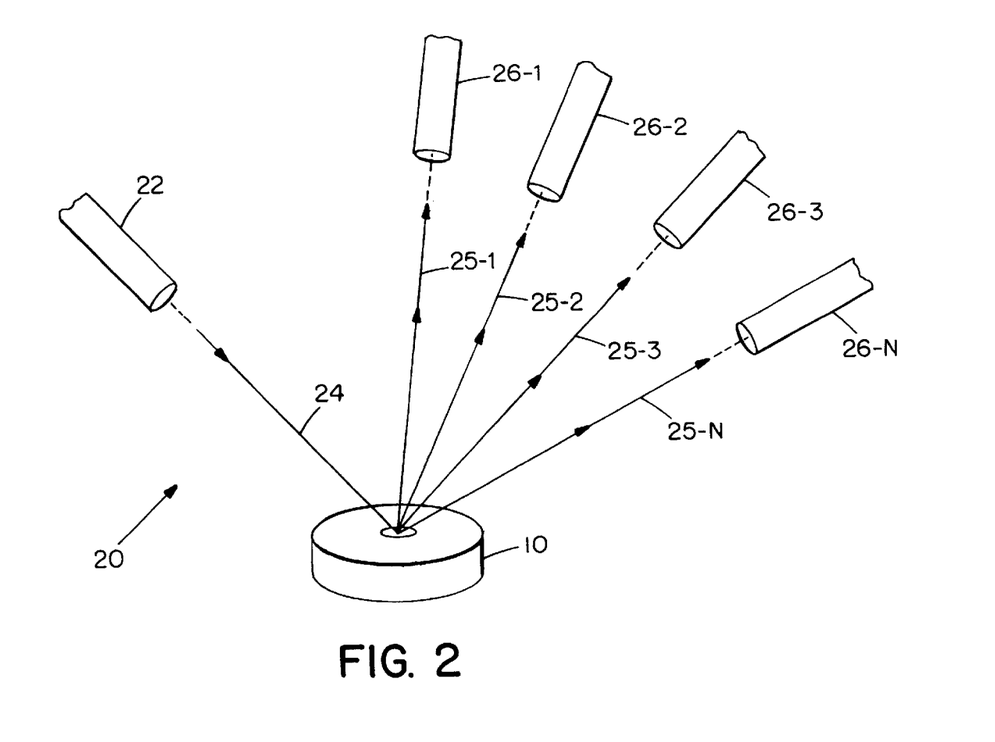
FIG. 2 is a schematic of an optical network implementing the fluidic optical switch of FIG. 1.

As illustrated in FIG. 2, the optical switch 10 is suitable for being implemented in a fiber optic network 20 to rout data streams. In the network 20, a single fiber 22 provides the incident light beam 24, and the optical switch 10 redirects the light beam as an output beam 25-1, 25-2, 25-3, . . . , or 25-N (collectively referred to as output beam 25) to a respective output fiber 26-1, 26-2, 26-3, . . . , or 26-N (collectively referred to as output fiber 26). Thus each optical switch 10 acts as a 1-to-N switching element in the fiber optic network 20. Typically, the index of refraction of the fibers is matched to that of the first fluid 16 to increase transmission and minimize dispersion effects. Corrective optics such as lenses may be used after fiber 22 and before output fiber 26 to add in collimation of the beam.

Figure 3:
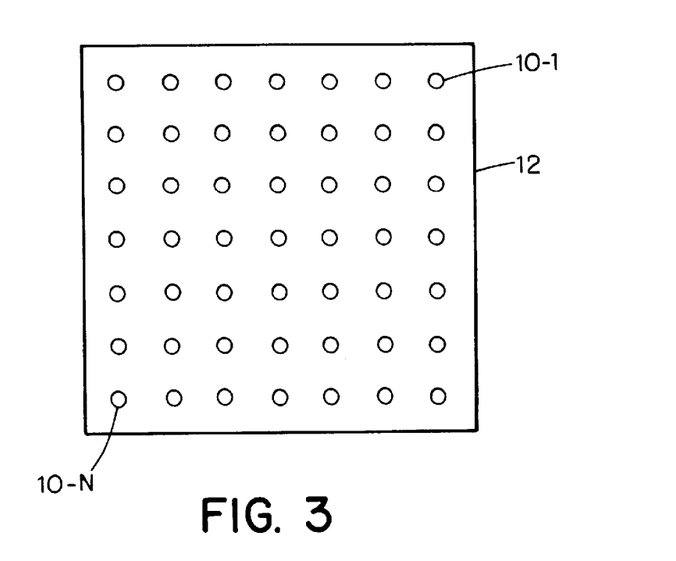
FIG. 3 is a top view of an array of switches which implements a multiplicity of the fluidic optical switch of FIG. 1.

In some embodiments, the optical switch 10 is a stand-alone unit as shown in FIG. 1. Alternatively, there may be a multiplicity of optical switches 10 which form an array 12 as illustrated in FIG. 3. When the switches are arranged as an array, one or more incident light beams are directed to any of the optical switches 10 of the array 12. The optical switches 10 then redirect the incident light beams to one or more directions.

Figure 4:
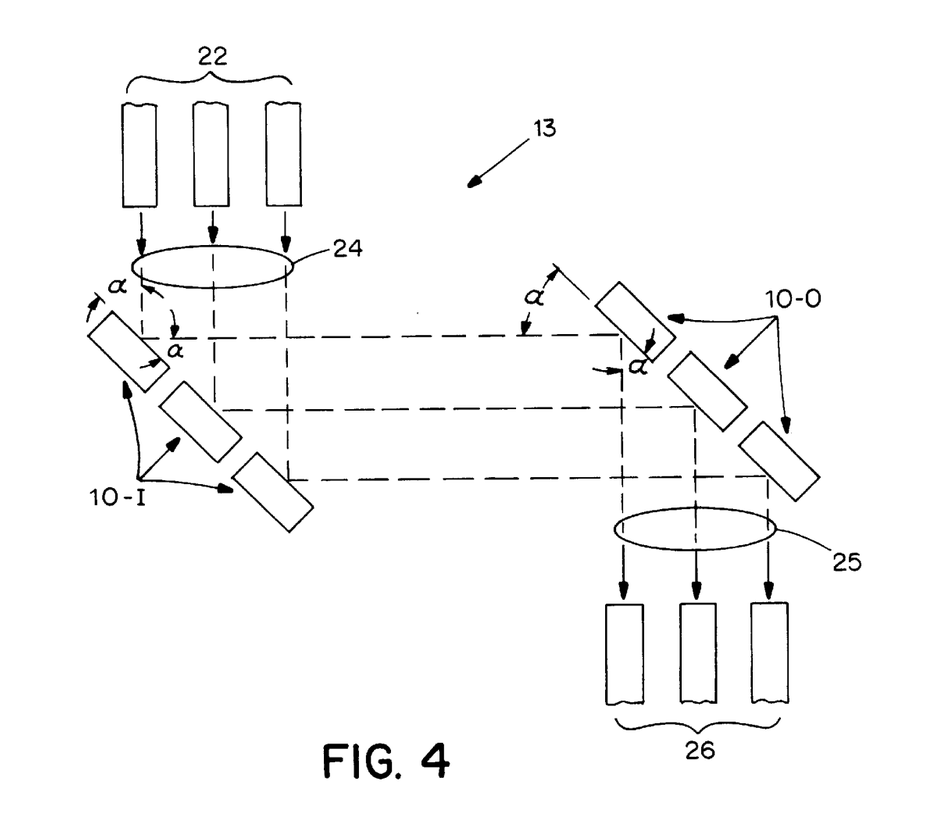
FIG. 4 is a top view of an cascaded array of optical switches.

Although described above as a 1-to-N switching element, the optical switch 10 can be part of a cascaded set of switching elements 13 as illustrated in FIG. 4. In such an arrangement, a set of input switches 10-I redirects each of the incident beams 24 to any one of the output switches 10-O, which in turn steer the beams to the output fibers 26. Alternatively, the output switches 10-O can direct the beams to another set of switches 10. The angle of reflection, "α", for the beams is typically about 45°. FIG. 4 illustrates a full N-to-N switching platform requiring 2N switches 10. Note that lens may be placed in the path of the beams to collimate the beams. Further, although the set of switching elements 13 is illustrated as a one dimensional switching platform over a single plane, additional layers of these platforms may be added to utilize two dimensional switching capabilities of each switch 10.

Figure 1A:
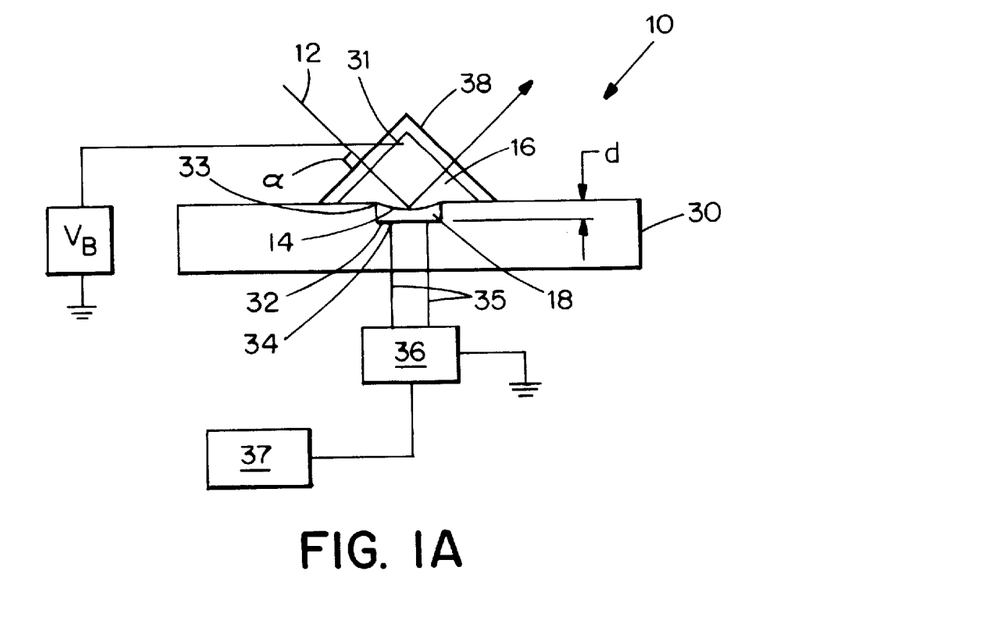
FIG. 1A is a side view of a fluidic optical switch in accordance with the present invention.

For the embodiments illustrated in FIGS. 3 and 4, it should be noted that if fluid 16 is in common to all the switches 10, then only one bias electrode 31 (FIG. 1A) is needed to hold the fluid 16 at a constant voltage, "$V_B$" (FIG. 1A).

Figure 1B:
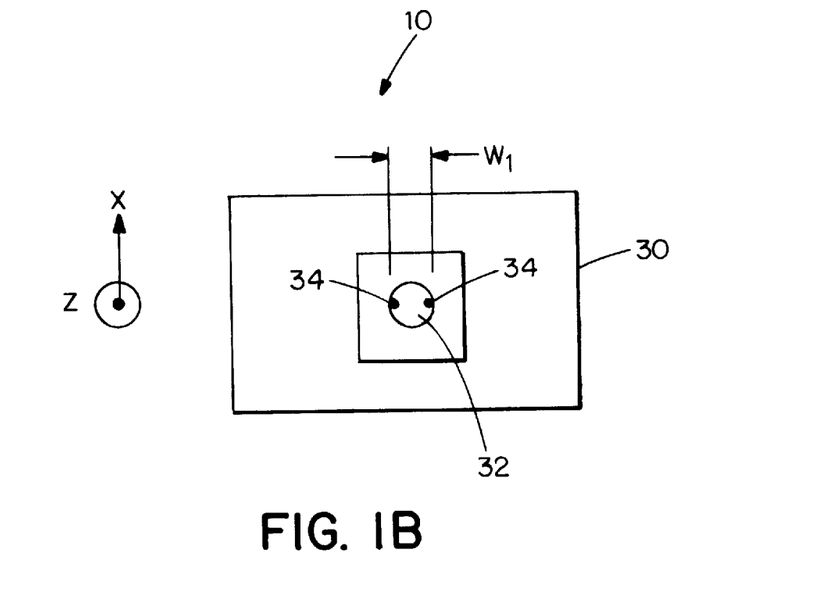
FIG. 1B is a top view of the fluidic optical switch of FIG. 1A.

Referring now in particular to FIGS. 1A and 1B, the fluidic optical switch 10 is provided with a base or insulating substrate 30 which defines a well 32. A first fluid 16 is located above and in contact with a second fluid 18 which is held in the well 32. A set of electrodes 34, connected to a variable voltage source 36 through a set of leads 35, is located at the bottom of the well 32, and is in contact with the second fluid 18. The voltage source 36 is typically coupled to a controller 37, for example a CPU, that determines which electrodes 34 to energize. A triangular window 38 attached to the base 30 contains the first fluid 16. The window 38 is typically oriented so that the incident light beam 12 strikes a wall of the window 34 at an angle, "α," of ninety degrees to ensure the most of the incident light beam intensity reaches the reflective surface 14 instead of being reflected by the window. If the window 38 is transparent, the optical switch 10 can be used for laser calibration and beam steering on an optics bench, for example.

Figure 5:
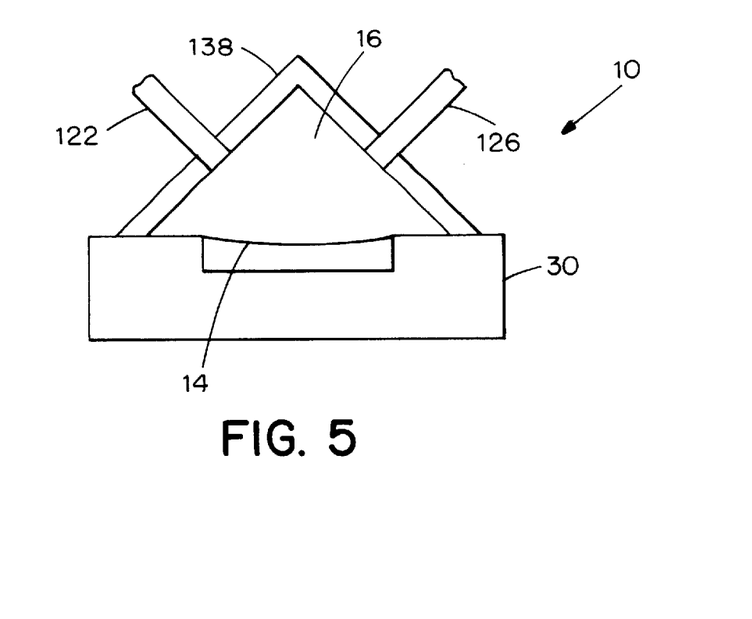
FIG. 5 is a side view of embodiment of the fluidic optical switch of FIG. 1 with fibers or waveguides attached to a housing of the switch.

In FIG. 5, there is shown an alternative embodiment of the optical switch 10 having a housing 138, encapsulating the first fluid 16, which serves to align an input fiber 122 and an output fiber 126, toward the reflective surface 14. In such an arrangement, except for the portions of the housing 138 attached to the fibers 122, 126, the housing may be opaque. Alternatively, waveguides may be used in place of the fibers 122, 126.

In the embodiment shown in FIGS. 1A and 1B, the first fluid 16 is electrically conductive and optically transparent at the wavelength used, and the second fluid 18 is a dielectric or electrically insulating. Each fluid 16, 18 can be a liquid or a gas. In one implementation, the first fluid 16 is salt water, or ionized water, and the second fluid is air. The salt water covers the air thereby forming the naturally reflective surface 14 at the interface between the salt water and the air. This interface is held in place by surface tension alone. The scale of the optical switch 10 is such that surface tension effects dominate the gravitational forces which permits the device to operate while tipped upside down or in any other configuration. In an alternative arrangement, organic liquids, such as, dimethyl sulfoxide, can be used as the first fluid 16 or second fluid 18.

As can be seen in FIG. 1A, the reflective surface 14 is slightly concave. The concavity of the surface is created by either adjusting the volume of the second fluid 18 or the pressure within the optical switch 10. The concavity of the reflective surface 14 focuses the incident beam 12 and thus reduces its divergence. The concavity does not negatively affect the actuation of the reflective surface 14, thus allowing for the controlled switching of a more focused beam.

The window 38 is made from any suitable transparent material such as, for example, acrylic. The base 30 is typically made of a silicon substrate so that the well 32 can be formed by may established micromachining techniques used in creating microelectromechanical systems (MEMS). For instance, the well 32 can be etched from the substrate 30. The depth, "d," of the well is about 0.001 inch to 0.01 inch and the diameter, "$w_I$," is about 0.02 to 0.07 inch. In one embodiment, the depth of the well is about 0.01 inch and the diameter is about 0.06 inch. The electrodes 34 are typically embedded in or formed on the substrate and are made of copper, or any suitable deposited metal. The electrodes 34 can be point electrodes, or shaped in other geometries such as a rectangular elongated electrodes.

Figure 1C:
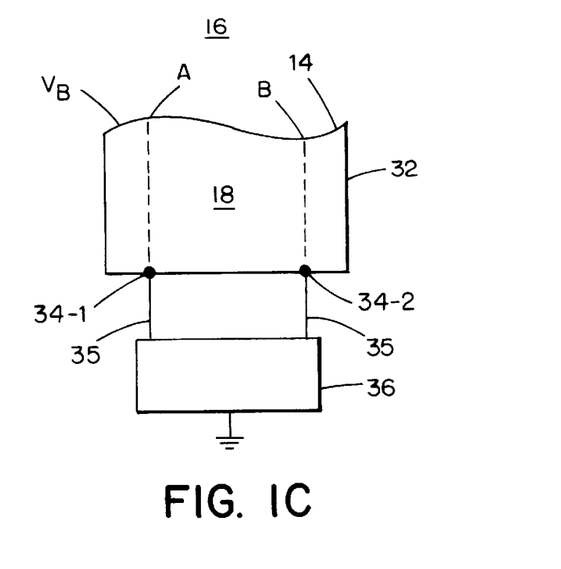
FIG. 1C is a detailed view of a fluid-fluid interface of the fluidic optical switch of FIG. 1A.

Referring also to FIG. 1C, in operation, the conductive fluid (first fluid 16) is biased with a constant voltage, $V_B$, for example, through an electrode 31 place in contact with the first fluid 16 so that the interface between the first fluid 16 and the second fluid 18 is an equipotential surface. The controller.37 is provided with computer software that controls the voltage source 36 to vary the voltage applied to each of the embedded electrodes 34, that is each electrode 34 is independently addressable. Thus, the controller 37 controls the spatial variation of the voltage potential between the reflective surface 14 and the electrodes 34 throughout the insulating second fluid 18. When one or both electrodes 34 are energized, an electrostatic force acts perpendicular to the reflective surface 14, in accordance with the distribution of the voltage potential. For example, if the bias voltage $V_B$, is positive value, a negative voltage applied to the electrode 34-2 attracts a region B of the reflective surface 14 towards the electrode such that the region B deflects downwards. Consequently, a region A of the reflective surface 14 bulges upwards due to mass conservation. Therefore, manipulating the voltage applied to the electrodes 34 results in controlled deformation of the reflective surface 14 and consequently controlled redirection of the incident light beam 12 to another direction. The optical switch 10 is able to switch in incident light beam 12 between to distinct points very quickly (e.g., in under 1 msec). The optical switch 10 is also capable of maintaining a constant displacement of the light beam for an extended period of time.

Figure 6A:
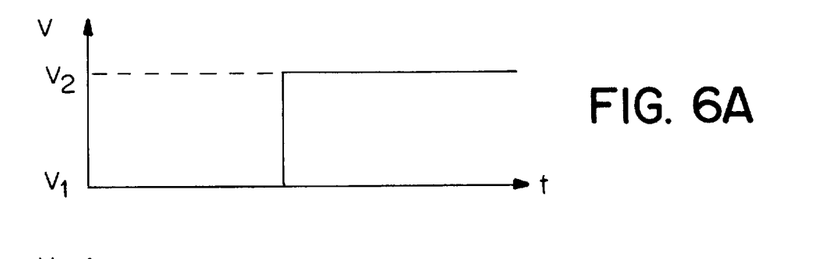
FIG. 6A is schematic illustration showing an input voltage applied to the fluidic optical switch of FIG. 1.
Figure 6B:
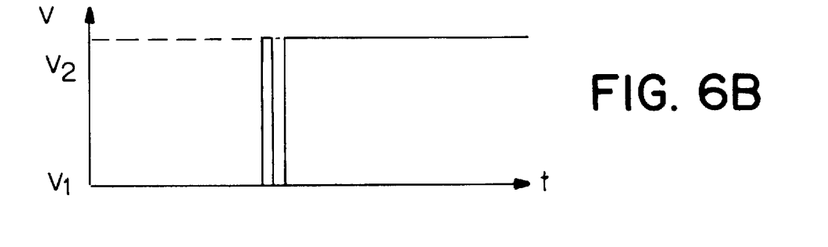
FIG. 6B is a schematic illustration showing the input voltage of FIG. 6A being modulated.

In the present invention, a step voltage, as shown in FIG. 6A, from $V_1$ to $V_2$ is typically applied to the electrodes. By modulating the signal, as shown in FIG. 6B, the switch 10 can redirect the incident beam from a position A to a position B with virtually no resonance in a time period Δt, which again is typically under 1 msec.

The optical switch 10 shown in FIGS. 1A and 1B is provided with two electrodes 34 which are arranged for switching an incident light beam to various points along the vertical direction Z coming out of the page. However, other electrode configurations can be used. For instance, there can be linear array of a multiplicity of electrodes aligned along an axis defined by the electrodes shown in FIGS. 1B or along an orthogonal axis. Alternatively, the electrodes can be arranged in an I×J array, where I may or may not equal J. An area array of electrodes provides an additional degree of freedom to allow two dimensional switching discussed earlier.

Figure 7:
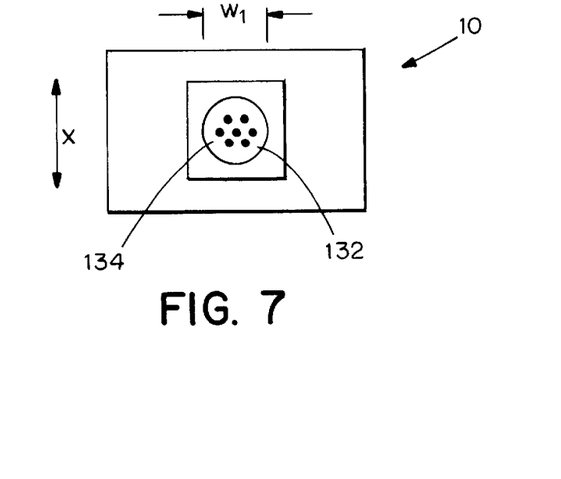
FIG. 7 is a top view of the alternative embodiment of the fluidic optical switch of FIG. 1.
Figure 8A:
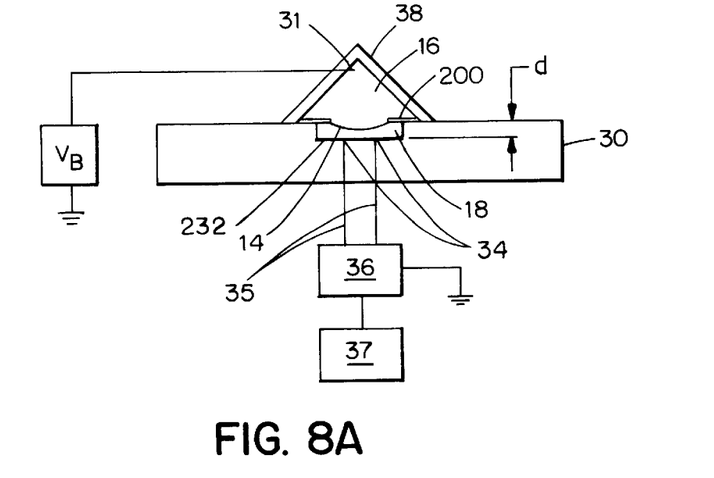
FIG. 8A is side view of another alternative embodiment of the fluidic optical switch shown with an ring placed over a well of the switch.
Figure 8B:
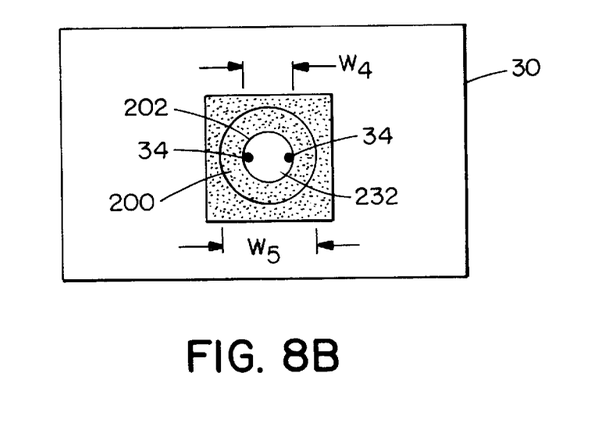
FIG. 8B is top view of the alternative embodiment of the fluidic optical switch of FIG. 8A.
Figure 9:
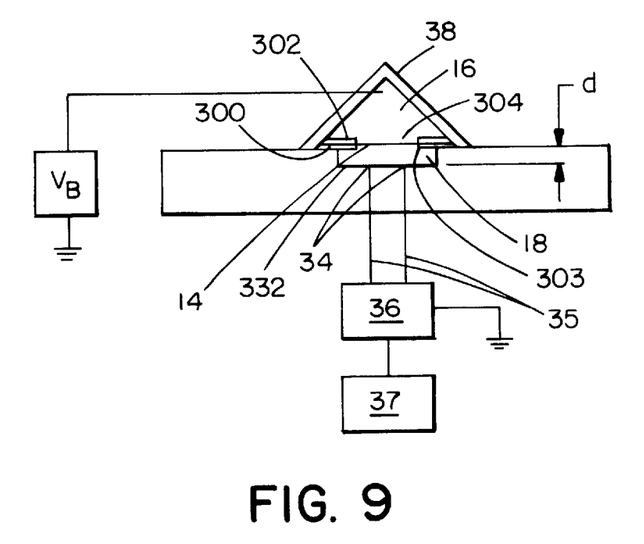
FIG. 9 is a side view of yet another alternative embodiment of the fluidic optical switch shown with a pair of layered rings placed over a well of the switch.
Figure 10:
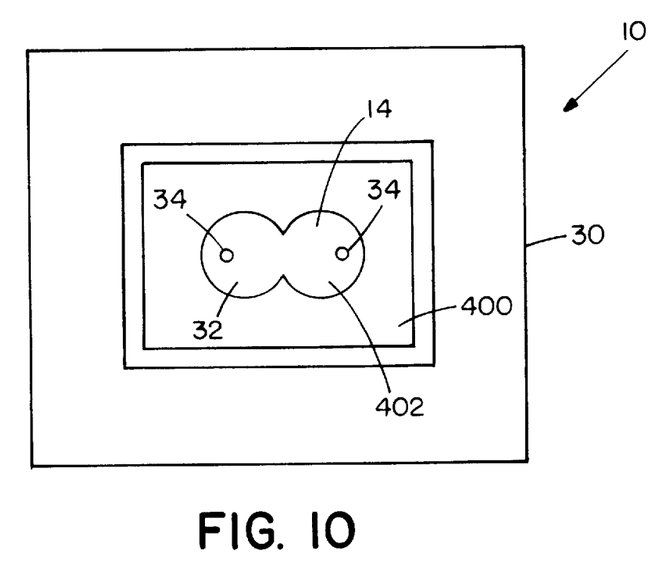
FIG. 10 is yet another alternative embodiment of the fluidic optical switch shown with a cap having non-circular opening located between two fluids of the switch.

Another arrangement for the electrodes is shown in FIG. 7. As can be seen in FIG. 7, a set of electrodes 134 is arranged in a circular array pattern at the bottom of a well 132 having a diameter "$w_I$," of about 0.06 inch. By arranging the electrodes as an area array, the optical switch 10 is able to redirect an incident light beam with an additional degree of freedom in the horizontal direction (indicated by the double arrow X).

Referring back to FIG. 1A, it can be seen that the outer perimeter of the reflective surface 14 is attached to the upper edge 33 of the well 32 at the interface between the first fluid 16 and the second fluid 18. There are, however, other ways to create points of attachment for the reflective surface.

For example, there is shown in FIGS. 5A and 5B the optical switch 10 provided with an ring 200 positioned above the second fluid 18. The ring has an inner rim that defines an orifice 202 having a diameter, "$W_4$," of about 0.02 to 0.07 inch. The well 232 has a diameter, "$w_5$," of about 0.08 to 0.1 inch so that an inner portion of the ring 200 overlaps a portion of the well 232. With the first fluid 16 and the second fluid 18 placed above and below the ring 200, respectively, the reflective surface 14 attaches to the inner rim of the ring 200.

Figure 6C:
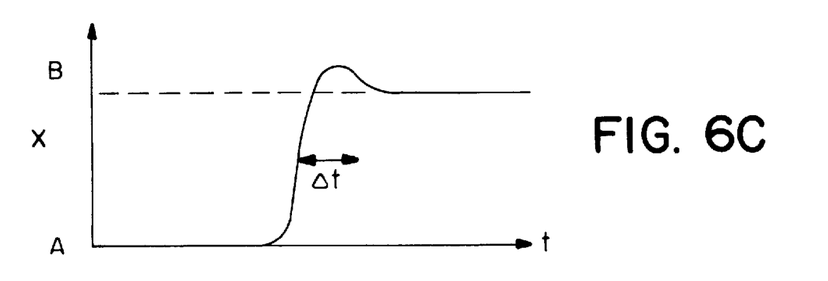
FIG. 6C is a schematic illustration showing the time sequence of the redirection of a light beam.

Referring now to FIG. 6, there is shown another embodiment of the optical switch 10 provided with two rings, a bottom ring 300 and a top ring 302. Here, the dimensions of both rings 300, 302 and that of the well 332 are the same as that of the ring 202 and the well 232 described above, respectively. In the embodiment shown in FIG. 6, the combination of the rings 300 and 302 has an inner rim 303 that defines an orifice 304. The reflective surface 14 attaches to the inner rim 303 where the top ring 302 meets the bottom ring 300. In some embodiments, the upper ring 302 is made from a hydrophobic material which repels liquids, while the lower ring 300 is made from a hydrophilic material which attracts liquids. Alternatively, the upper ring 300 can be made from hydrophillic material, and the lower ring can be made from hydrophobic material. The ring 200 or the rings 300, 302 may be bonded together and to the substrate 30, or they may be micromachined directly out of the substrate 30.

In either the embodiment shown in FIG. 5 or that shown in FIG. 6, the one or more rings provides precise control of the location of the reflective surface 14. That is, the rings help trap the insulating fluid so that during the fabrication of the optical switch 10, the reflective surface 14 is easily created by merely placing a liquid over the well. Thus, the reflective surface 14 "self-assembles," which facilitates fabricating the optical switch 10 with high repeatability.

In the embodiments of the invention discussed above, the reflective surface 14 stretches across an orifice or opening that has a circular shape. The optical switch 10, however, does not require the use of a circular shaped orifice or opening. For example, there is shown in FIG. 7 the optical switch 10 provided with a cap 400 placed above the well 32. The cap 400 has a non-circular opening 402 across which the reflective surface 14 stretches.

By altering the size and shape of the opening across which the reflective surface stretches, the natural frequency of the reflective surface 14 can be varied. In general, it is desirable to have a reflective surface with a very high natural frequency because a higher natural frequency corresponds to faster switching capabilities. The natural frequency of the reflective surface can also be increased by decreasing the size of the well and/or changing the density of the two fluids.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical switch, comprising:
a first fluid;
a second fluid positioned adjacent to and in contact with the first fluid, the interface between the first fluid and the second fluid being a reflective surface; and
electrodes applying an electrical field across the second fluid to alter the geometry of the reflective surface and redirect an incident light beam.

2. The optical switch of claim 1, wherein the first fluid is a conductive fluid.

3. The optical switch of claim 1, wherein the first fluid is an immiscible liquid, and the second fluid is another immiscible liquid.

4. The optical switch of claim 1, wherein the first fluid is an organic liquid.

5. The optical switch of claim 1, wherein the first fluid is a liquid.

6. The optical switch of claim 3, wherein the second fluid is a gas.

7. The optical switch of claim 1, wherein the first fluid is biased with a constant voltage.

8. The optical switch of claim 1, wherein the second fluid is an insulating fluid.

9. The optical switch of claim 1, wherein the second fluid is a liquid.

10. The optical switch of claim 1, wherein the second fluid is a gas.

11. The optical switch of claim 1, wherein the electrical field is generated by a variable voltage.

12. The optical switch of claim 11, wherein the variable voltage is modulated.

13. The optical switch of claim 1, wherein the electrodes are positioned beneath the reflective surface and on the same side of the reflective surface as the second fluid, the electrical field being generated by energizing at least one electrode with a variable voltage source.

14. The optical switch of claim 1, further comprising a well in which the second fluid is located, and at least one electrode positioned at the bottom of the well and in contact with the second fluid, the electrical field being generated by energizing at least one electrode with a variable voltage source.

15. The optical switch of claim 14, wherein the well has a depth of about 0.001 to 0.01 inch.

16. The optical switch of claim 14, wherein the well has a diameter of about 0.02 to 0.07 inch.

17. The optical switch of claim 14, further comprising a first ring, the inner rim of the ring defining an orifice, and the reflective surface attaching to the inner rim across the orifice.

18. The optical switch of claim 17, wherein the well has a diameter of about 0.02 to 0.1 inch.

19. The optical switch of claim 17, wherein the ring has an inner diameter of about 0.02 to 0.07 inch.

20. The optical switch of claim 17, wherein the ring has a thickness of about 0.00004 to 0.003 inch.

21. The optical switch of claim 17, further comprising a second ring positioned adjacent to, in contact with, and coaxially with the first ring.

22. The optical switch of claim 21, wherein the combination of the first ring and the second ring has a rim which defines an orifice, and the reflective surface attaches to the rim where the first ring meets the second ring.

23. The optical switch of claim 21, wherein the well has a diameter of about 0.02 to 0.1 inch.

24. The optical switch of claim 21, wherein the first ring and the second ring have an inner diameter of about 0.02 to 0.07 inch.

25. The optical switch of claim 21, wherein the first ring and the second ring have a thickness of about 0.00004 to 0.003 inch.

26. The optical switch of claim 21, wherein the first ring is formed of a hydrophobic material and the second ring is formed of a hydrophilic material.

27. The optical switch of claim 14, further comprising an overlapping top positioned over the well, the overlapping top having an orifice.

28. The optical switch of claim 27, wherein the orifice is circular.

29. The optical switch of claim 27, wherein the orifice is non-circular.

30. The optical switch of claim 14 wherein the well is etched from a silicon substrate.

31. The optical switch of claim 1, further comprising an transparent housing for containing the first fluid.

32. The optical switch of claim 31, wherein a wall of the transparent housing is positioned so that the surface of the wall is orthogonal to an incoming beam.

33. The optical switch of claim 31, wherein the transparent housing is made of acrylic.

34. The optical switch of claim 1, further comprising a housing for containing the first fluid, the housing being adapted for connecting in optical communication to an input fiber and in optical communication to an output fiber.

35. The optical switch of claim 1, further comprising a housing for containing the first fluid, the housing being adapted for connecting in optical communication to an input waveguide and in optical communication to an output waveguide.

36. The optical switch of claim 1, wherein the switch is able to switch from one incoming direction to a multiplicity of directions.

37. The optical switch of claim 36, wherein the switch is a one-to-N switching element.

38. An optical switch, comprising:
    a conductive first fluid;
    a insulating second fluid positioned adjacent to and in contact with the first fluid, the interface between the first fluid and the second fluid being a reflective surface;
    a well in which the second fluid is located; and
    at least one electrode positioned at the bottom of the well and in contact with the second fluid, the at least one electrode generting an electrical field across the second fluid to alter the geometry of the reflective surface and redirect an incident light beam.

39. A method of optically steering a light beam, comprising
    providing a reflective surface defined by the interface between a first fluid and a second fluid placed in contact with the first fluid; and
    altering the geometry of the reflective surface, thereby redirecting an incident light beam.

40. The method of claim 39, further comprising applying a constant voltage to the first fluid.

41. The method of claim 40, further comprising applying an electrical potential across the second fluid to alter the geometry of the reflective surface.

42. The method of claim 41, wherein applying an electrical potential includes modulating the voltage applied across the second fluid.

* * * * *